J. B. WOLFORD.
Corn Sheller.
No. 105,872.  Patented July 26, 1870.
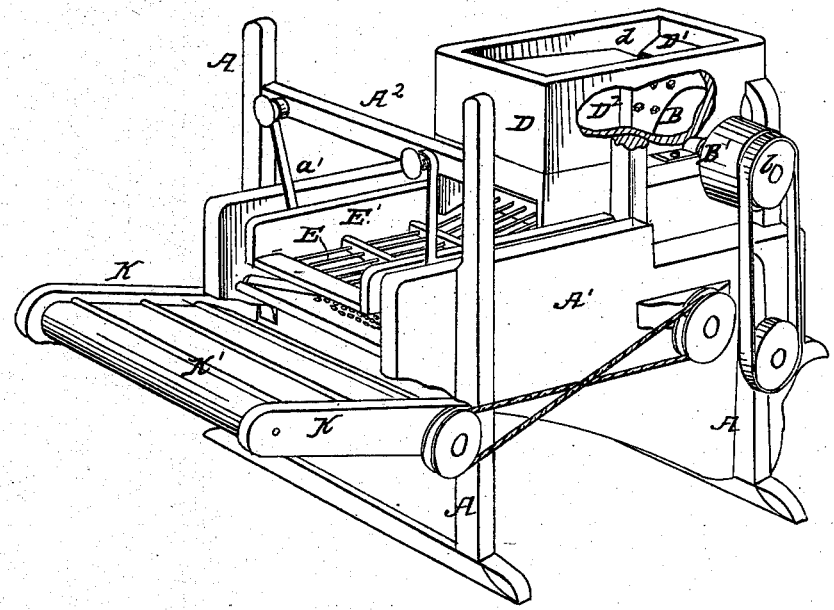
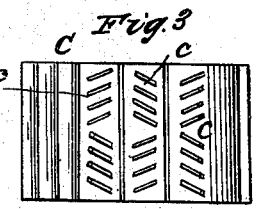
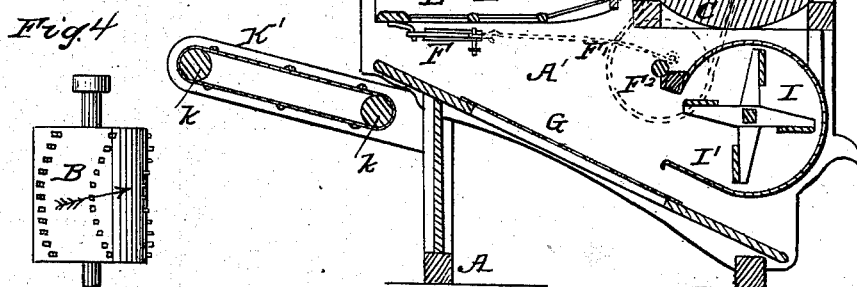
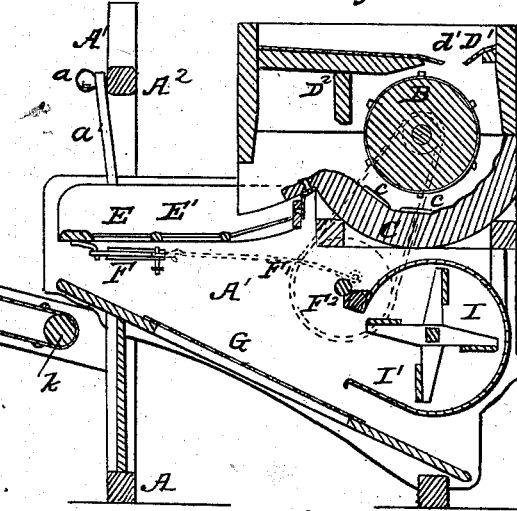
Witnesses
Alex Mahon
H. H. Doubleday
Inventor
John B. Wolford
by his Attorney
Addison M. Smith

United States Patent Office.

JOHN B. WOLFORD, OF LANCASTER, OHIO.

Letters Patent No. 105,872, dated July 26, 1870.

IMPROVEMENT IN CORN-SHELLERS.

The Schedule referred to in these Letters Patent and making part of the same.

*To all whom it may concern:*

Be it known that I, JOHN B. WOLFORD, of Lancaster, Fairfield county, State of Ohio, have invented certain new and useful Improvements in Corn-Shellers, of which the following is a full, clear, and exact description, reference being had to the accompanying drawing making part of this specification, in which—

Figure 1 is a perspective view of my improved sheller;

Figure 2 is a vertical longitudinal section;

Figure 3, a detached view of the concave, showing the arrangement of the ribs; and Figure 4, a detached view of the cylinder, showing the arrangement of the teeth.

The invention relates to that class of shellers in which a spiked cylinder, not unlike that of a thrashing-machine, is employed, in combination with a ribbed concave, for the purpose of removing the corn from the cob, and consists in—

First, a concave, having rows or ribs placed alternately on different diagonal lines, combined with a cylinder, having its teeth placed in curved lines, the outer ends of said curves occupying a forward position with reference to the direction in which the cylinder revolves.

Second, in forming a supplemental chamber in front of the cylinder and hopper, into which the corn is thrown by the centrifugal force of the cylinder, and from which it (the corn) falls upon the riddle, but is not allowed to rebound and be again carried around between the cylinder and the concave, whereby much of it would be broken.

Third, an elastic or yielding flap or apron, forming part of, or attached to the throat in the bottom of the hopper, through which the ears of corn pass, the object of the apron being to prevent the escape of loose kernels of corn which are thrown from the revolving cylinder.

In the drawing—

A are posts, which, with sides $A^1$, form the framework which supports the working parts of the sheller.

$A^2$ is a girt connecting the upper ends of the two parts at the rear or discharging end of the machine.

B is a cylinder, constructed substantially like those in general use in this class of shellers. The teeth on this cylinder are not placed in rows which run straight across on lines parallel with its axis, but are placed in curved lines, the center of which recede, assuming that the cylinder runs in the direction indicated by the arrows in fig. 4.

This cylinder is mounted upon shaft $b$, which is supported, by means of a frame-work or other suitable construction, at the front end of the machine.

$B'$ is a pulley or band-wheel, keyed to shaft $b$.

C is a concave formed in the arc of a circle, and adjustably supported at a proper distance below cylinder B. This concave may be cast in one piece, though, for convenience, I usually prefer to make it in sections, as shown in fig. 3.

Each of these sections is armed with a number of ribs, $c$, placed on lines diagonal to the edges of said sections. All of the ribs on one section are not, however, parallel with each other, but are arranged as follows: The two nearest the center are placed at an angle of about thirty degrees to each other, and then the remaining ones are placed parallel to the one to which they are contiguous, on either side of the center. In alternate sections, the arrangement of ribs should be relatively reversed, so that, in concaves composed of three sections, the position occupied by the ribs would be substantially that represented in fig. 3.

D is a hopper-box, of a square or rectangular form, having a throat, $d$, through which the corn is fed to the cylinder.

$D^1$ is an elastic wing or apron, forming one side of said throat, being constructed so as to yield, for a purpose which will be hereinafter explained.

A partition, $D^2$, divides the lower part of this hopper-box into two chambers, one of which may be called the cylinder-chamber, and the other the deflecting-chamber.

Immediately in rear of the cylinder is placed the separator, the front end of which is represented as being suspended from the concave, while the rear end is adjustably suspended from girt $A^2$, by means of pins $a$ and straps $a'$.

The bottom of the separator is made of bars or rods, E, running lengthwise from end to end, and are supported, at two or more intermediate points, by being passed through cross-bars $E'$, having their ends attached to the sides of the separator, as is clearly shown in fig. 1.

A vibratory motion is imparted to the separator by means of bell-crank F, which is in turn operated by pitman $F^1$, from crank-wheel $F^2$, both being shown in dotted lines in fig. 1.

G is a chute-board, placed in an inclined position below the separator, and extending from the rear end of the sheller to its front end, as in fig. 2.

I usually prefer to provide the central portion of this chute-board with perforations, as shown in the drawing, but this may not be essential.

I is a fan or blower inclosed within the shell or drum $I'$, the open or blast side of this drum being toward the chute-board and separator.

K K are arms projecting from the rear end of the sheller;

*Assignor to himself & Thomas B. Whiley of same place.*

$k\ k$ are rollers mounted in said arms; and $K'$ is an endless carrying-apron or belt passing around rollers $k$, and actuated by them.

The operation of my machine is as follows:

Motion being communicated to cylinder B by hand or other power, the corn is fed through the hopper, the yielding apron or wing $D^1$ bending down far enough to permit the ear to pass through the throat.

After passing the throat, the ear is carried around between the cylinder and the concave, where, owing to the peculiar arrangement of the teeth and ribs upon the parts, the corn is entirely removed from the cob.

The corn and cobs are then thrown up into the chamber formed in the rear end of the hopper-box, and then falls upon the separator, where the corn and cob are divided, the corn passing down the chute-board, and thence out at the front of the machine, while the cobs are carried over the rear end of the separator onto the endless apron, which deposits them at a convenient distance from the machine, or, by elevating the outer end of said apron sufficiently, the cobs may be loaded upon a wagon.

When the corn and cobs are thrown from the concave into the deflecting-chamber, there would more or less of it rebound onto the cylinder, and be carried around through the concave again, which would break a portion of the corn; besides which, the cobs would interfere with the proper shelling of the ears just introduced; but, by means of the partition $D^2$, this return of corn and cobs is wholly prevented.

While the corn is passing from the separator or riddle down to and over the chute G, it is subjected to the action of a blast from the fan I, for the purpose of removing all chaff and other impurities.

The transverse bars $E'$ allow the cobs to pass readily over them, but check the movement of the corn, whereby it (the corn) is compelled to pass through the riddle. Thus a perfect separation is effected.

Having now described my invention,

What I claim as new, and desire to secure by Letters Patent, is—

1. In the corn-sheller herein described, the throat, provided with the yielding flaps or wings $D^1\ d$, (one or both,) for the purpose of feeding the ears of corn longitudinally, as set forth.

2. In the corn-sheller, the concave C, provided with ribs $c$, arranged in sections on diagonal lines, with the angle of presentation on alternate sections reversed, in combination with the shelling-cylinder B, provided with teeth, arranged in curved lines, substantially as set forth.

3. The combination, in a corn-sheller, of the hopper, provided with the elastic throat $D^1\ d$, the deflecting-chamber, as described, the shelling-cylinder B, and concave C, arranged and operating substantially as set forth.

JOHN B. WOLFORD.

Witnesses:
VIRGIL E. SHAW,
SAML. WHILEY.